United States Patent [19]

Ritzerfeld

[11] 4,068,948

[45] Jan. 17, 1978.

[54] COPYING APPARATUS

[76] Inventor: Gerhard Ritzerfeld, Schorlemer Allee 14, 1000 Berlin 33, Germany

[21] Appl. No.: 668,182

[22] Filed: Mar. 18, 1976

Related U.S. Application Data

[63] Continuation-in-part of Ser. No. 592,846, July 3, 1975.

[30] Foreign Application Priority Data

July 4, 1974 Germany .............................. 2432424
Feb. 13, 1975 Germany .............................. 2506127

[51] Int. Cl.² ........................................... G03B 27/62
[52] U.S. Cl. ....................... 355/75; 355/47; 355/53; 355/71
[58] Field of Search ................ 355/75, 71, 53, 47–51, 355/40

[56] References Cited

U.S. PATENT DOCUMENTS

| 3,642,370 | 2/1972 | Meredith et al. ....................... 355/75 |
| 3,784,303 | 1/1974 | Sullivan, Jr. et al. .............. 355/53 X |
| 3,880,521 | 4/1975 | Eppe et al. ......................... 355/75 X |
| 3,990,794 | 11/1976 | Nittmann ................................ 355/75 |

Primary Examiner—Richard A. Wintercorn
Attorney, Agent, or Firm—Michael J. Striker

[57] ABSTRACT

An electrostatic or xerographic copying apparatus having a transparent support on which an original is placed face down so as to be copied through the support has a first arrangement capable of holding first members which form with one another a gap, and a second arrangement capable of holding an original which overlies the first members so that portions of its face are visible through this gap. An arrangement is provided for shifting the second arrangement relative to the first arrangement so that different increments of the original can be exposed in the gap.

10 Claims, 11 Drawing Figures

COPYING APPARATUS

CROSS REFERENCE TO RELATED APPLICATION

This application is a continuation-in-part of my copending and commonly assigned patent application Ser. No. 592,846 filed July 3, 1975.

BACKGROUND OF THE INVENTION

The present invention relates to a copying apparatus, and in particular to electrostatic or xerographic copying.

Copying apparatus of the type in question is in worldwide use and comprises a transparent support, for example a glass plate or the like, onto which the material to be copied is placed face down. In many instances it is desired not to copy the entire original, but only to copy selected portions thereof. For this purpose it is known in the prior art to provide an arrangement in which only portions of the rotating copying drum of the apparatus are electrostatically charged so that the electric charges of these selected portions correspond to the parts of the original that are to be copied so as to copy only these portions of the original.

However, this approach requires rather substantial changes in existing copying apparatus which is of the type constructed for copying only the original in its entirety. Conversion for copying only sections of the original involves such far-reaching changes in the construction and operation of such apparatus that it is very expensive.

SUMMARY OF THE INVENTION

Accordingly, it is a general object of this invention to overcome the disadvantages of the prior art.

Another object is the provision of an improved copier which advances principles set forth in the above-described copending patent application.

Another object is the provision of an improved method for operating a copier of the above-described type.

More particularly, it is an object of the invention to provide an arrangement which permits an existing copying apparatus of the above-described general type which is inherently constructed only for copying an original in its entirety to be converted without any difficulties and any substantial expense so that it can also be used for copying only separate spaced portions of an original.

In keeping with these objects, and with others which will become apparent hereafter, one feature of the invention resides in a copying apparatus of the type having a transparent support on which an original is placed face down so as to be copied through the support, a combination comprising first means on the support forming a slot, and second means on the first means adapted to hold an original and operative for advancing stepwise relative to the first means so as to expose successive portions of the original in the slot.

Preferably, a first mounting device is provided extending along an of the original, for example a clamping device, which is capable of holding the second means directly or indirectly. The second means may be blank sheets, or they may be portions of a form which are to be copied, and whereon portions of the original held by the second means are to be copied together with the first means. The advancement of the second means can be effected stepwise by means of a stepping arrangement, for example a stepping motor or the like, and an automatic operation of the stepping arrangement by a step can be effected after each copying cycle, for example by means of a contact timer or the like. In order to be able to select particular portions of the original held in the second means, a keyboard may be provided having keys each of which represents for example a respective portion or line of the original in the second means, so that when the particular key is depressed that particular line or combination of lines will be selected for exposure in the slot.

The first means advantageously has two parts, one of them stationary and the other adjustable with reference to a stationary part so that the width of the slot defined between them can be varied as desired.

The first means may comprise a transparent plastic envelope into which originals, forms, or the like can be placed, and the same may be true of the second means.

Thus, the copying method according to the present invention comprises the steps of supporting an original face down on a transparent support, interposing a mask formed with a slot between the original and the support so as to expose only a portion of the original through the slot to a scanner on the other side of the support, scanning the original through the support to produce a copy carrying only that portion of the original exposed through the slot, and after each scanning relatively displacing the original in the mask to expose a different portion of the original to the scanner for the subsequent scanning step. Thus each time the copier scans the original will produce a copy carrying a different portion of the original.

According to yet another feature of this invention the apparatus is provided with means connected to the scanner which senses the relative positions of the original and the mask and automatically displaces the original or the mask after each scanning operation so as to expose another portion of the original to the scanner. Thus each time the scanner sweeps automatic apparatus in the arrangement stops the mask and the original relative to each other. Such an automatic stepper comprises switches engageable with the clamp holding either the original or the mask and means for sensing the position of this clamp. A step drive connected to this sensing means and to the scanner serves to detect the end of the sweep of the scanner on each scanning operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
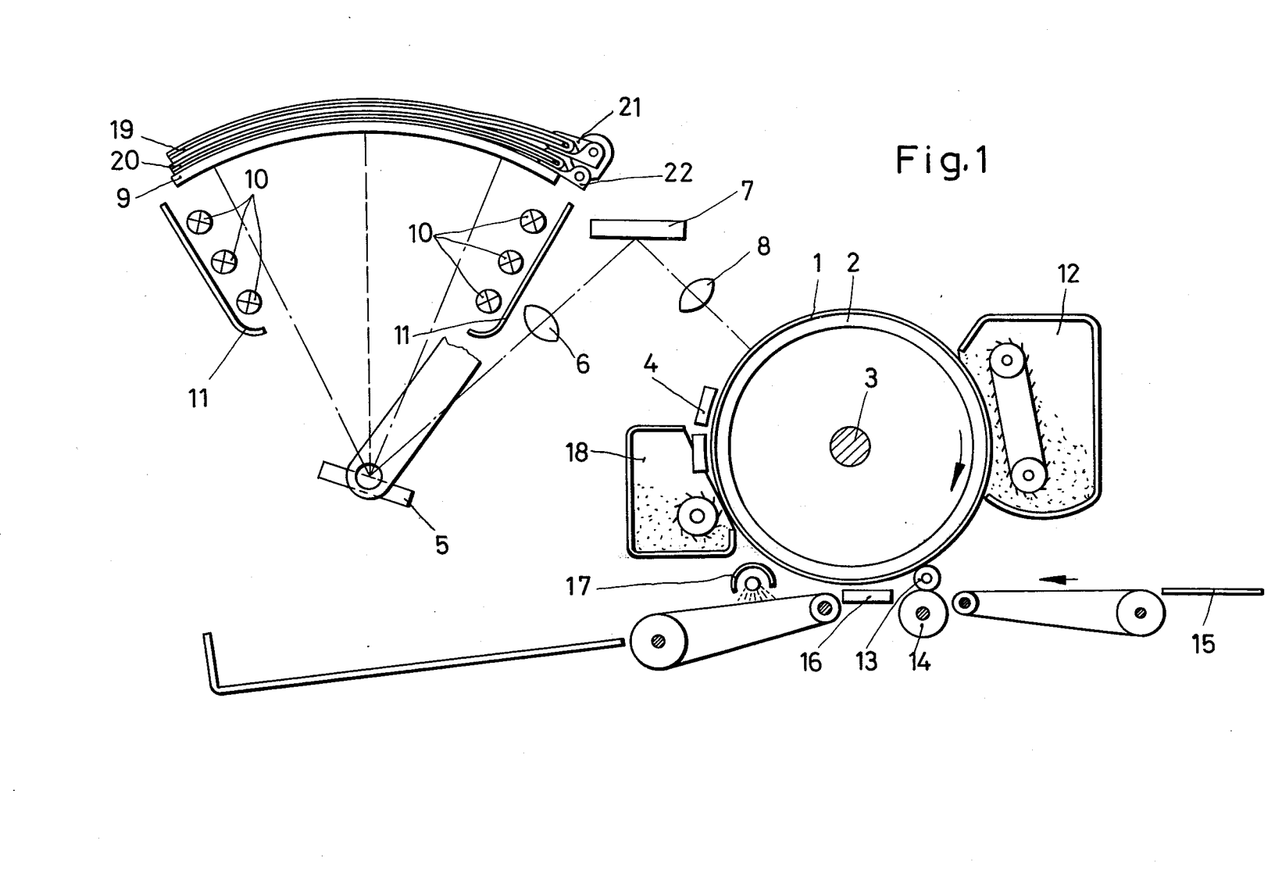
FIG. 1 is a diagrammatic side view of portions of a xerographic copier, shown in simplified form.

Referring first to FIGS. 1 -4, which show one embodiment of the present invention, it will be seen that the xerographic copying apparatus shown in FIG. 1, which is conventional except for the details of the present invention, has a copying drum 2 provided with a light-sensitive layer 1 and rotatable about the shaft 3 by a drive (not shown). Provided at the outer periphery of the drum, extending over the entire axial length thereof, is a charging arrangement 4 which serves to charge the layer 1 as it travels past it. A tiltable mirror 5, a lens 6, a fixed mirror 7, and a further lens 8 are provided to project onto the layer 1 a mirror image of an original placed upon a transparent support 9. Lamps 10 and reflectors 11 which cooperate with them are provided to direct light against the original on the support 9.

The tiltable mirror 5 is moved synchronously with the drum 2 and thus reflects those portions of the original which are not covered onto the layer 1. The electric charges which have previously been applied to portions of the layer 1 by the device 4 are negated on those portions of the layer 1 which do not have parts of the original projected onto them, so that only at the remaining portions do the charges remain. During the further rotation of the drum 2 the thus-charged portions of the layer 1 move into the region of a toner-powder applying device 12 which brings toner powder in contact with the layer 1 so that the powder adheres to the layer 1, but only on those portions which are electrostatically charged. A copy sheet 15 is advanced by rollers 13 and 14, and is charged by a transfer device 16 to pick up the toner powder from the layer 1 and form a replica of the original. The sheet 15 then travels through a fixing station in which the powder replica is fused by means of an infrared radiator 17, and the finished copy is thus produced. The layer 1 has residual powder removed from it in a cleaner 18 before it is recharged for producing the next copy.

According to the present invention, the material to be copied is placed in this embodiment into transparent plastic envelopes 19 and 20 so that those surfaces of the materials which are to be copied face towards the support 9. The envelopes 19 and 20 are mounted on clamping devices 21 and 22 which extend over the entire length of the support 9, along an edge thereof. However, the materials could also be mounted directly in the clamping devices 21 and 22, omitting the envelopes 19 and 20.

Figure 2:
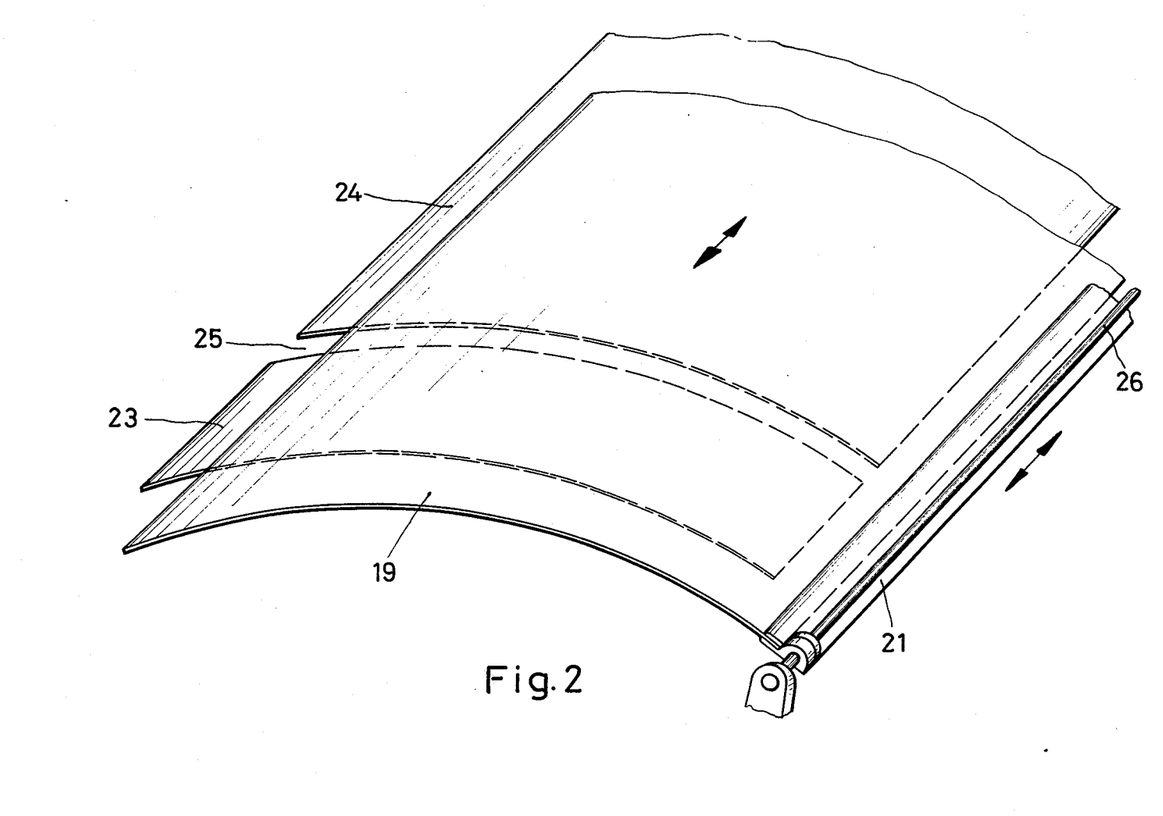
FIG. 2 shows in perspective an arrangement for stepwise advancing the original or the mask.

The arrangement of the materials 23 and 24 is clearly visible in FIG. 2. However, to keep the Figure from becoming unclear, the lower clamping device 22 and the envelope 20 held by it, as well as the original which is present in the upper envelope 19, have not been shown. Located in the not-illustrated envelope 20 of the lower clamping device 22, will be mask parts 23 and 24 (which are shown in FIG. 2) which form with one another a gap or slot 25 of a desired width. A portion of the original located in the upper envelope 19 will be visible through this gap 25 from below, i.e. through the support 9. The clamping device 21 can be shifted along a shaft 26 as indicated by the arrow, so that depending upon the position of the clamping device 21 different portions or increments of the upper original which is located in the envelope 19 will be visible through the slot 25 and can therefore be copied onto the layer 1. The stepwise advance of the clamp 22 is described below with reference to FIG. 7.

It is, for example, often necessary to copy a form which has a head portion that remains unchanged, but wherein different additional portions must be copied along with the head portions, and these different additional portions may vary from copy to copy. In the context of the invention as illustrated, it may be assumed that the mask part 23 contains the information provided for the head portion, whereas the original which moves with the upper clamping device 21 contains the varying items of information that are to be included in the head portion and which may vary from copy to copy. The mask part 24 may be nothing more than a blank sheet, but of course it may also carry its own separate information if desired.

It will be appreciated that the arrangement of the present invention makes it possible to make copies composed of a standard picture, a set of items, writings or the like, and wherein items which vary from copy to copy can be included merely by shifting the original in the upper envelope relative to the gap so that different portions of the original in the upper envelope 19 become exposed in the gap. Moreover, the apparatus of the present invention makes it possible to carry out such operations on a conventional electrostatic or xerographic copying machine without having to effect any significant changes in the machine, and thus without incurring additional expenses. If special copies are to be produced which in addition to the information of the head part provided on the part 23 also have to include all or a large part of the original in the envelope 19, then it is merely necessary to remove the part 24.

Figure 3:
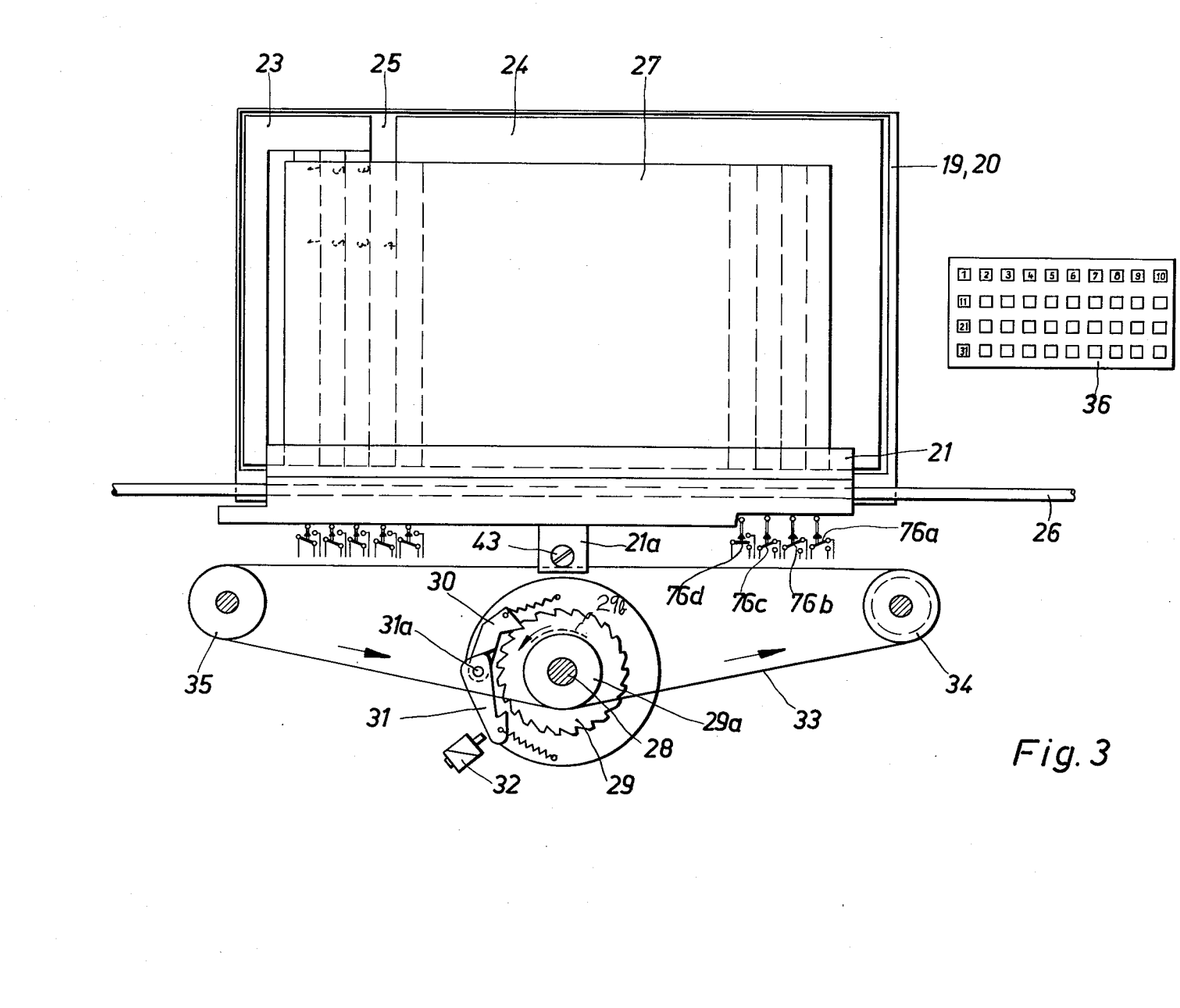
FIG. 3 is a top-plan view showing a stepping arrangement of the apparatus.

FIG. 3 shows an arrangement for stepping the upper clamping device 21 with its associated envelope 19 and an original 27 located therein. This arrangement has a toothed wheel 29 that can turn about a shaft 28 and is biased by a not-illustrating spring to turn in the direction of the arrow on the wheel 29. A pawl 30 and an actuating pawl 31 are jointly pivoted at 31a and alternately. By momentary excitation of an electromagnet 32 which acts upon the pawl 31 and upon the pawl 30 jointly pivoted therewith, the wheel 29 is turned by its spring through an angular distance determined by the angular spacing of teeth on the wheel. The wheel has a hub 29a with which the clamping device 21 is connected via a rope, wire, or cable 33 that is trained about rollers 34 and 35. The rope or wire is connected to a member 21a which is fastened to the device 21 or as a part thereof, so that each brief excitation of the electromagnet 32 causes the device 21 and therefore the upper original 27 to be stepped, for example through the distance of one line of printing. The individual lines of the original 27 have buttons of a keyboard 36 associated with them, so that as described below with reference to FIG. 7 when a particular button is pushed, the electromagnet 32 is excited by an electric circuit a number of times until the original 27 assumes the desired position as determined by positioning switches 76a–d. The spring, which expends energy in response to the stepwise turning of the wheel 29, is tensioned again by the rope 33 spanned over the rollers 34, 35 and a drive (not shown) which can be coupled with the roller 34. In so doing, the original 27 is returned to its starting position. In place of the embodiment illustrated in FIG. 3, an appropriately controlled stepping motor can be used.

It is frequently desired that the variable data which are included in successive copies be taken from successive lines of an original, such as the original 27. In such a case automatic advancement of the original by one or more lines after each copy cycle is desired. This can be effected in known manner by means of a contact timer which is provided with a turnable contact arm and which controls the electromagnet 32.

It is also possible, according to the present invention, to construct the lower clamping device 22 so that it is of two parts, the mask parts 23 and 24 thus having respective clamping devices. It may be shiftable lengthwise of its longitudinal axis, with reference to the clamping device for the other part 23, so that the width of the gap 25 can be selected at will, as described with reference to FIG. 8, or the gap can even be completely closed. This is a simple manner of determining in advance the number of lines or the size of steps of the original 27 which are to be exposed in the gap 25. Any desired stepping arrangement, for example the type described with respect to FIG. 3, can be used for the shifting of the original 24 and the associated part of the clamping device.

Figure 4:
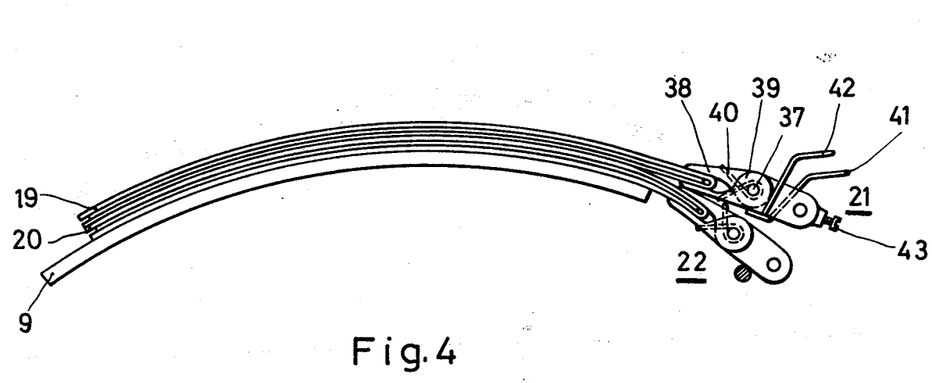
FIG. 4 shows clamping arrangements for the original and mask.

The clamping devices 21 and 22 may be of the type which is explained and shown in detail in FIG. 4. As shown there, the clamping device 21, which is identical to the device 22, has two jaws 38 and 39 which are connected so that they can tilt relative to one another about a shaft 37. The jaw ends facing the originals or the envelopes in which the originals are received are urged together by a spring 40. Manually operable levers 41 and 42 are provided, each connected with one of the jaws 38 and 39, to permit them to be opened counter to the force of the spring 40, thus to make possible a simple replacement of the transparent envelopes and/or the originals and masks. A screw 43 serves to effect axial shifting of the clamping device.

It is also desirable in some instances, as indicated earlier, that the original to be incrementally exposed in the gap between the two lower mask parts, be advanced automatically in response to each copying cycle of the apparatus. This can be triggered by a movable component of the apparatus which performs identical movements during each copying cycle, for example the copying drum or one of the movable mirrors. The automatic advancement can be effected by means of electromagnets or by means of a stepping motor.

Figure 5:
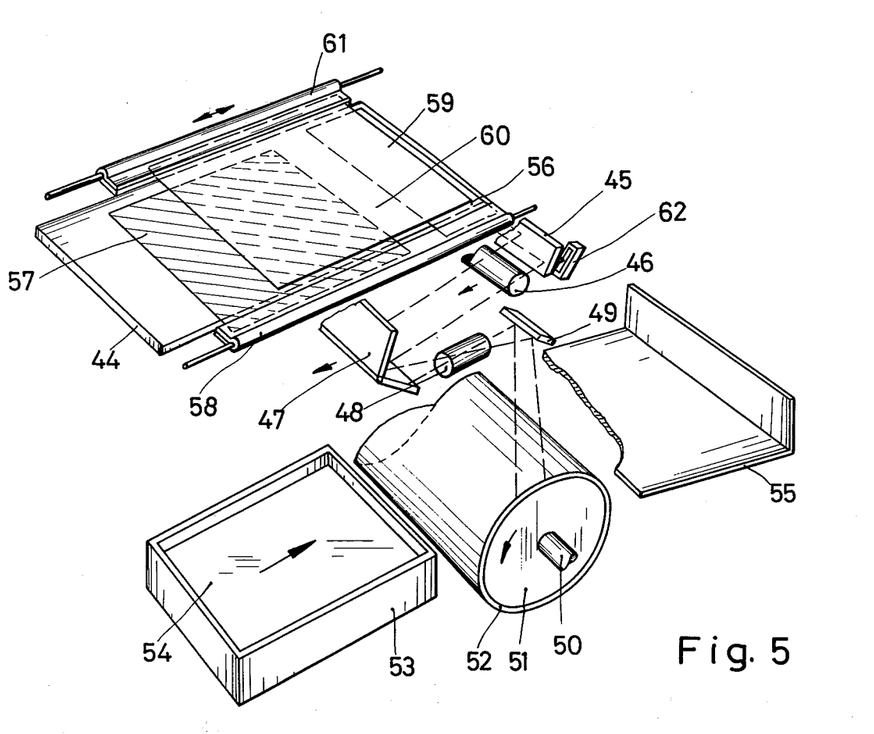
FIG. 5 is a diagrammatic view, illustrating in a simplified form another xerographic copier.
Figure 6:
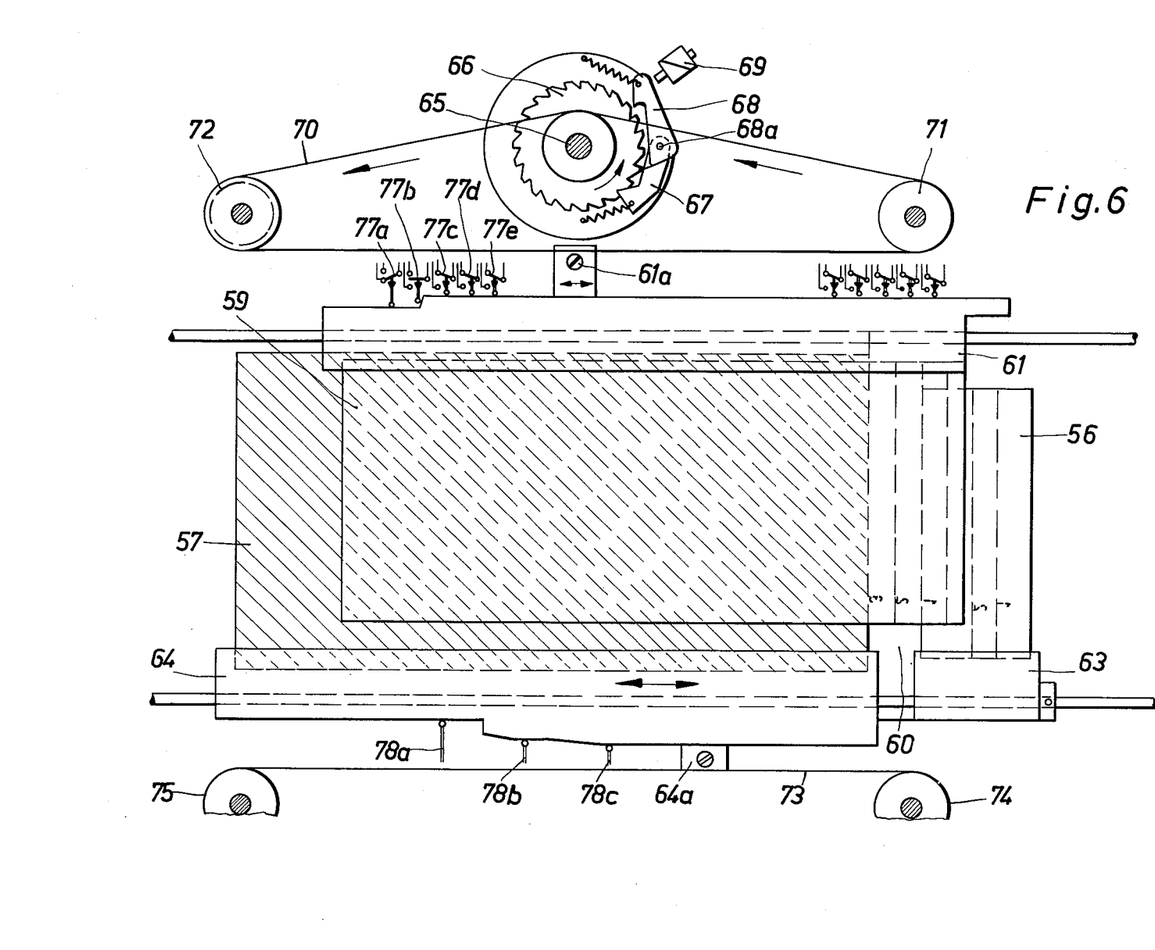
FIG. 6 is a detail view, showing an arrangement for effecting stepwise advance of portions of both the original and the mask.

Such embodiments are illustrated in FIGS. 5 and 6, where it will be seen that beneath the transparent support which is identified with reference numeral 44 in FIG. 5, there is provided a mirror 45 which is movable parallel to the support 44 during a copy cycle, that is during the making of a single copy. The mirror 45 has a light source 46 fixedly mounted for movement with it, and there is provided an also horizontally shiftable double mirror 47 which twice reflects the image coming from the mirror 45 and whose movement is coupled with that of the mirror 45. A lens arrangement 48 is also provided, as well as a further mirror 49 which casts the image of the original or originals located on the transparent support 44 upon a portion of the light-sensitive layer 52 that is provided on the drum 51 which turns in counterclockwise direction on a shaft 50.

Figure 9:
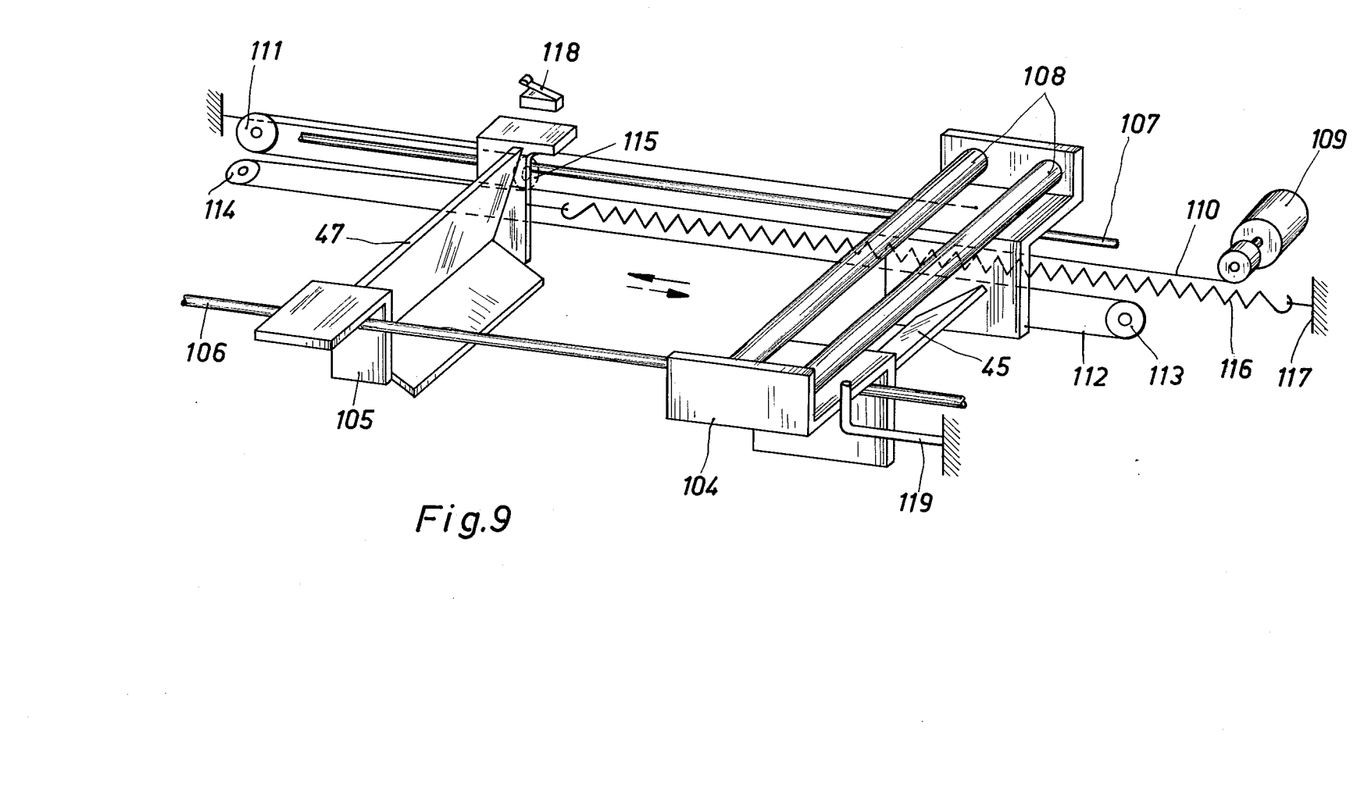
FIG. 9 is a perspective and partly diagrammatic illustration showing the drive for the scanner in accordance with this invention.

FIG. 9 shows how the mirror 44 is carried on a slide 104 and a double mirror 47 on a slide 105 displaceable parallel to each other on respective guide rails 106 and 107. In addition two parallel light bulbs 108 defining an exposure slot are carried on the slide 104 for irradiating the faces of the mask parts 56 and 57 and the original 59. A fixedly mounted motor 109 carries a drum around which is wound a cable 110 that passes over an idler roller or sheave 111 and has an end connected to the slider carriage 104. A further cable 112 passes over fixed idler rollers 113 and 114, over an idler roller 105 carried on the slide 105 and has its opposite end fixed to the housing of the apparatus. A spring 116 is secured to the opposite side of the slide 105 and at its other end to the support 117 so as normally to pull the slide 105 to the right as seen in FIG. 9. Operation of the motor 109 to wind up the cable 110 will therefore displace the slide 104 to the left in FIG. 9 at a predetermined velocity. Such a displacement will cause the slide 105 also to be displaced toward the left as seen in FIG. 9, but with a speed that is half that of the slide 104. Thus, the length of the path followed by light between the support 44 and the drum surface 52 will be the same regardless of which portion of the original 59 or masks 56 and 57 is being scanned. At the end of this travel the slide 104 actuates a switch 118 which shuts off the motor 109 so that the spring 16 can return the slides 104 and 105 toward the right as shown in FIG. 5.

A container 53 contains copy sheets 54 in a stack, and these are moved beneath the drum 51 individually in a manner known from the art, coming in contact with the layer 52 and thereupon being transported to a tray 55, also in known manner. During the contact the powder from the layer 52 is transferred to the copy paper 54 to form the copy image thereon. The means for producing the copy image are not illustrated in this Figure, but they have been shown in FIG. 1 and are in any case completely conventional.

Located on the transparent support 44, if desired in a transparent envelope, is a first mask part 56 which contains the head information, i.e. the information that remains unchanged from copy to copy. There is further provided a second mask part 57, and both of these are held by a stationary clamping device 58. They form with one another a gap or slot-shaped opening 60 which extends parallel to the lines of information on the mask part 56 and to the lines of an original 59 which overlies the parts 56 and 57. Thus, one or more lines of the original 59 will always be visible in the gap 60. The original 59 is engaged directly by a clamping device 61, or indirectly in that it may be located in a transparent plastic envelope. The clamping device 61 is elongated in the direction of travel of the copying papers 54 and can be shifted in this direction in mutually opposite sense, as indicated by the double-headed arrow, so that any desired portions of the original 59 can be placed in registry with the gap 60 and copied.

According to the invention, the original 59 is to be automatically advanced in dependence upon the number of copying cycles that are to be carried out. For this purpose, a switch 62 is provided which is briefly activated whenever the mirror 54 returns after a single copy cycle to its starting position. However, in place of the switch 62 it is also possible to use a switch that is actuated by a cam provided on and rotating with the drum 51. In any case, however, the switch 62 or the equivalent thereof controls the displacement of the clamping device 61, so that after each copying cycle the device 61 and the original 59 can be moved through a predetermined distance corresponding, for example, to the distance between successive lines of printing on the original 59, or to the distance between any desired number of lines of printing. The shifting takes place automatically upon completion of every copying cycle and thus successive copies are produced with different portions of the printing or other material that is carried on the original 59.

In place of the parallel clamps for the mask parts 56–57 on the one hand and the original 59 on the other hand, it is also possible to have the clamping devices extend normal to one another.

FIG. 6 shows a top-plan view of the original 59 with its movable clamping devices 61, as well as of the mask parts 56 and 57. Contrary to FIG. 5, the parts 56 and 57 are not held in a joint fixedly mounted clamping device but are held in separate clamps 63 and 64, respectively. The clamp 63 for the part 56 carrying the head information is fixedly mounted; the clamp 64 for the part 57, however, is shiftable in the same direction as the clamping device 61, as indicated by the arrow. This makes it possible to vary the width of the gap 60 and thus to predetermine in advance the number of lines to be copied in the gap 60 from the original 59 together with the information on the original 56.

The stepping of the clamping device 61 is again effected by means of a stepping arrangement which has a toothed wheel 66 that can turn on a shaft 65 and which is urged in one direction by a not-illustrated spring. A blocking pawl 67 and a switching pawl 68 are pivoted together at 68a and engageable between the teeth of the wheel 66. An electromagnet 69 acts on the pawls 67 and 68 and, when energized or excited, permits the wheel 66 to be turned by the spring through an angular distance equal to 360° divided by the number of teeth on the wheel. The clamping device 61 is connected with the wheel 66 via a rope, wire or cable 70 which is sheaved on rollers 71 and 72 and connected to a member 61a of the device 61. Energization of the electromagnet 69 thus causes the original 59 to be shifted relative to the mask parts 56 and 57, for example by a step corresponding to the distance between lines of the original 59. The electromagnet 69 is energized by the switch 62 shown in FIG. 5. It is preferable, however, to control the energization of the electromagnet 69 in such a manner that it can be effected not only via the switch 62, but that it is possible to override the switch 62 and to energize the electromagnet selectively and at will, for example by means of push-buttons or the like which cooperate with positioning switches 77a–e and the like engageable with a step on the clamp 61.

The spring which unwinds as the wheel 66 turns is rewound by a drive which can be coupled with the roller 72. At this time, the original 59 is also returned to its starting position. The arrangement in FIG. 6 can also be replaced by an appropriately controlled stepping motor.

The shifting of the clamping device 64 can be effected by a device similar to the one illustrated in FIG. 6; by way of example, a rope or wire 73 and two rollers 74 and 75 of such a device have been illustrated, the rope 73 being connected with the clamping device 64 via an element 64a. The displacement of the clamping device 64 is effected independently of the number of copying operations being carried out, and can be controlled manually, for example, by means of push-buttons or the like.

Figure 7:
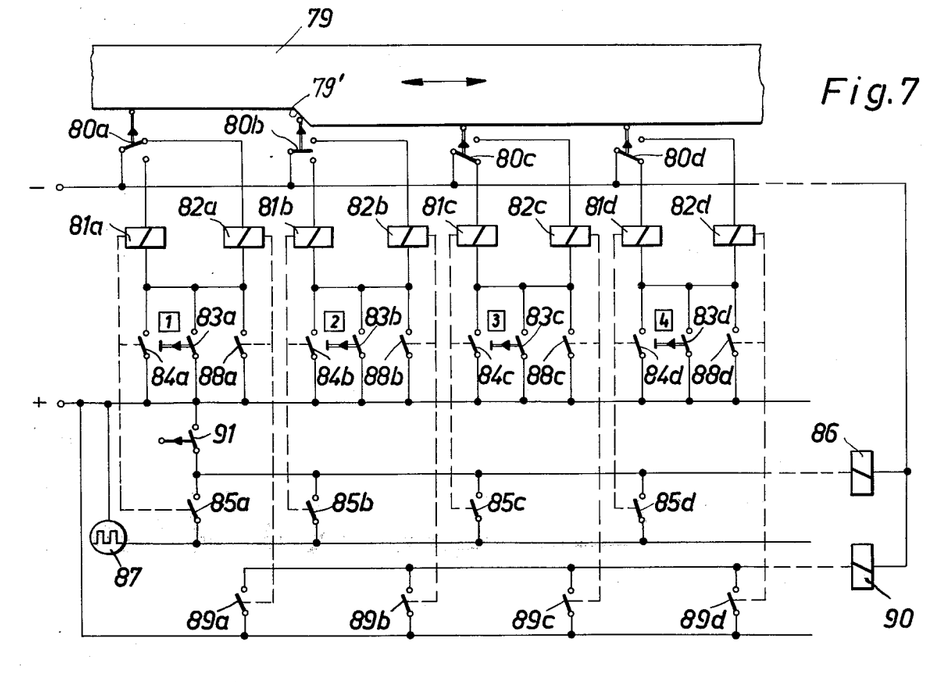
FIG. 7 is a largely schematic view illustrating the sensor for the stepping drive according to this invention.

The arrangement shown in FIG. 7 has a clamp slide 79 functionally identical to the clamps 61 and 21 and capable of holding either an original 59 or 27 or a pair of mask parts 56 and 57 or 23 and 24, respectively. This slide 79 has a step 79' on its one edge engageable with forty SPDT positioning switches four of which are shown at 80a–d. Each of these switches 80a–d has a front contact capable of operating a respective relay 81a–81d and a back contact capable of operating a relay 82a–d. Respective switches 83a–d which are provided on the keyboard 36 (see FIG. 3) are able to connect the other side of the relays 81a–d and 82a–d to one side of a source of power, whereas the switches 80a–d are capable of connecting the other sides of these relays to the other side of the electric power source.

Each of the relays 81a–d has a respective latching contact 84a–d connected across the respective push button switch 83a–d and a further contact 85a–d. Each of these contacts or switches 85a–d is connected on one side to a power source 87 that periodically emits direct-voltage current pulses and the other side of each of the switches 85a–d is connected to an electromagnet 86 functionally identical to the electromagnet 32 of FIG. 3 or 69 of FIG. 6. In addition, each of the relays 82a–d has a respective latching contact 88a–d connected across the respective operating switch 83a–d and a further contact 89a–d. Each such contact or switch 89a–d has one side connected to one side of the voltage pulse and another side connected through an electromagnetic clutch 90 to the other side of the relay. This electromagnetic 90 connected between a continuously rotating motor and the pulley 34 of FIG. 3 or the pulley 72 of FIG. 6 serves to rotate the respective pulley in a direction to move the respective cable 33 or 70 in a direction opposite that indicated by the arrows.

Figure 10A:
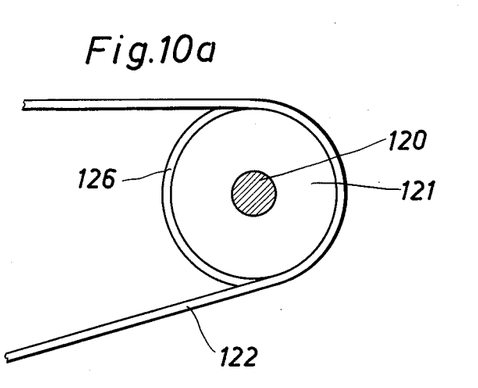
FIGS. 10a and 10b are side and top views, respectively, of a clutch according to the present invention.
Figure 10B:
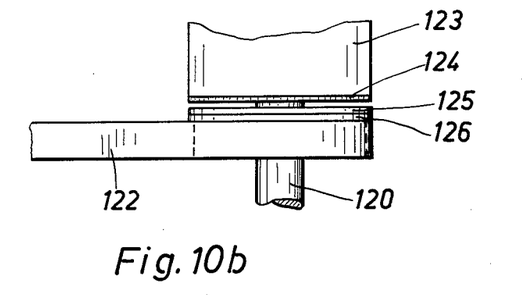

FIGS. 10a and 10b show a shaft 120 that is continuously rotated by a motor and on which is rotatable a pulley 121 carrying a cable or belt 122 that are functionally identical to the pulleys 34 and 72 and cables 33 and 70. The shaft 120 also carries an electromagnet 123 functionally identical to the electromagnet 90 and carrying a friction layer 123 engageable with a friction layer 125 carried on the rim 126 of the wheel 121. Thus electrical actuation of the electromagnetic clutch 123 will bring the surfaces 124 and 125 into axial contact and rotationally link the pulley 121 to the shaft 120, reverse driving the flexible drive element 122.

With further reference to FIG. 7, it can be seen that the switches 80a–d are each capable of connecting one of their relays 81a–d or the other of their relays 82a–d or neither of these relays to the one side of the power source. In the illustrated example of FIG. 7 the switch 80a connects its relay 82a to the one side of the power source whereas the sensor switch 80b at the step 79' has disconnected both of its relays 81b and 82b from the power source. The switches 80c and 80d to the other side of the step 79' connect their relays 81c and 81d to the power source.

In the illustrated position it is clear that the operation of the switch 83b for the second line of the master or original will have no effect on the circuit and both of the relays 81b and 82b are open-circuited. Operation on the keyboard 36 of the button corresponding to the first line of the original and connected to switch 83a, will, however, allow the relay 82a to close, as its other side is connected to the front contact of the switch 80a to the power source. Such instantaneous closing of the relay 82a will cause it to latch closed by means of its contact 88a and will simultaneously close the switch 89a. This will cause the electromagnetic clutch 90 to close and displace the clamp 79 in a direction tending to move the step 79' toward the switch 80a. When this step 79' does indeed contact the switch 80a it will pull its pawl away from the front contact and force the relay 82a to open, thereby opening the switch 89a and releasing the clutch 90 to stop displacement of the slider of the clamp 79. In this manner the original will be positioned so that its first line is aligned with the respective slot 25 or 60.

When in the position of FIG. 7 the switch 83d on keyboard 36 is closed in order to position the original with its fourth line aligned with the slot 25 or 60, the respective relay 81d will close momentarily. Such momentary closing will latch this relay 81d shut by means of the contact switch 84d and will close the respective switch 85d. The pulse source 87 will therefore feed pulses through the electromagnet 86 so as to step the respective wheel 29 or 66 until the step 79' moves over and aligns with the switch 80d and allow the pole of this switch to move away from the back contact. This open-circuits the relay 81d and opens the contact 85d to disconnect the electromagnetic 86 from the source 87 and stops the clamp 79 from moving. Thus operation of any of the switches of the keyboard 36 will cause the respective clamp to move in the appropriate direction to position the respective line of the original in front of the slot 25 or 60.

Figure 8:
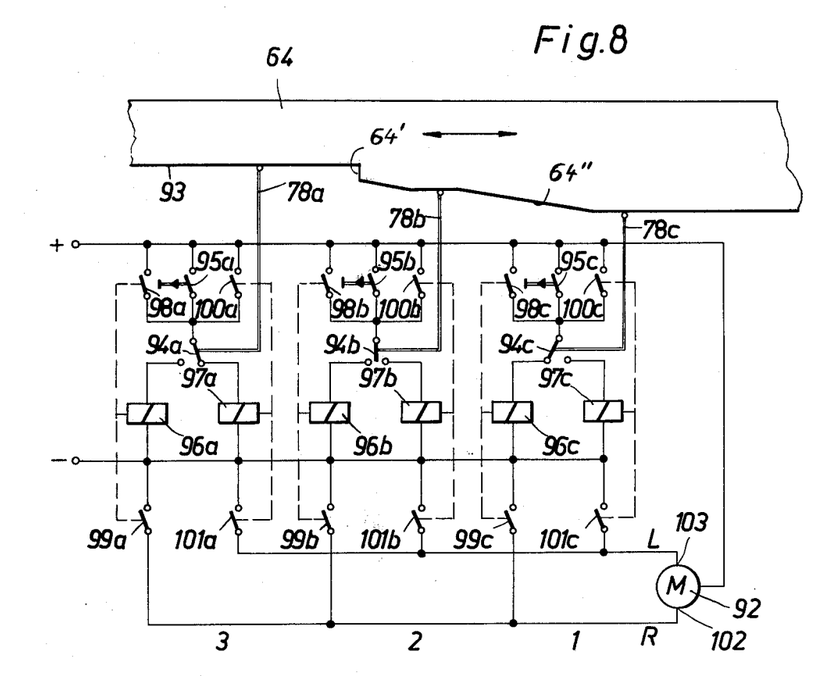
FIG. 8 is a largely schematic view illustrating the sensor for mask-width adjustment according to this invention.

A momentary contact switch 91 is also provided in this arrangement and can correspond to the switch 62 of FIG. 5 or 118 of FIG. 9 and can function identically to the switches 85a–d to connect the electromagnet 86 to the other side of the power supply and thereby feed a single electrical pulse to this electromagnet 86 each time it is closed, thereby causing it to step the respective wheel 29 or 66 each time it is closed. Thus, the machine can be set up so that each time it makes a copy the original 27 or 59 is automatically advanced by a single step. It is possible to connect the switches 80a–d together in pairs or triplets in order to effect two-line or three-line stepping of the original also. or The arrangement in FIG. 8 shows how the clamp 64 gripping the lower portion 57 of the mask has two steps 64' and 64" so as to subdivide its edge 93 into three different levels. Three switches 94a–c are connected to respective feelers 73a–d spaced apart, like the steps 64', 64" by distances equal to the distance between adjacent lines on the master 59 or mask portion 56. In addition the apparatus has three mode switches 95a–c selectively operable to set the mask 64 so that the space 600 has a width of 3, 2 or 1 line.

To this end each of the switches 95a–c has one side connected to a power source and another side connected to the pawl of the respective switch 94a–c. Each such switch 94a–c has a front pole connected to one side of a relay 96a–c whose other side is connected to the other side of the power source and back pole connected to one side of a relay 97a–c whose other side is also connected to the other side of the power source. Each of these relays 96a–c has a latching contact 98a–c in parallel to the respective normally open pushbutton switch 95a–c and another switch 99a–c. Furthermore, each of the relays 97a–c has a respective latching switch 100a–c connected across the respective operating switch 95a–c and another switch 101a–c. The switches 99a–c are all connected on one side to the power supply and on another side to the right-hand input 102 of a motor 92. The other switches 101a–c are connected between the same side of the power supply and the left-hand input 103 of the reversible motor 92 which is also connected to the other side of the power supply.

The motor 92 is directly connected to the pulley 75. In addition, the switches 95a–c and feelers 78a–c are so arranged that each switch is opened when its respective feeler lies between the steps 64' and 64", the pole of the respective switch lies in contact with the back contact when on the other side of the step 64' and on the front contact when on the other side of the step 64'.

In the arrangement illustrated in FIG. 8 the slide 64 is positioned such that the gap 60 has a width of 2 lines. Operation of the switch 95b which would normally set the gap 60 to have a width of two lines will, therefore be ineffective as the pole of the switch 94b lies between its contacts and can operate neither 96b nor relay 97b.

In this position, however, even instantaneous actuation of the switch 95a for three-line width would cause the relay 97a to close and latch itself with the contact 100a. This would also close the switch 101a to energize the left-hand input 103 of the motor 92 and move the slide 64 to the left until the feeler 78a passes the step 64' and the switch 94a was opened completely. Then the slider 64 would stop, at which time the gap 60 would have a width of three lines.

If, on the contrary, the switch 95c were operated with the arrangement in the position as shown in FIG. 8, the relay 96c would close and latch and would close the contact 99c to feed the right-hand input 102 of the motor 92. The slide 64 would therefore be moved to the right until the feeler 78c came between the steps 64" and 64' to open circuit the switch 94c and disconnect the relay 96c. In this manner the width of the gap 60 can readily be set by operation of any of three pushbuttons corresponding to switches 95a–c. It is of course possible to provide more than three such pushbuttons, each such extra pushbutton requiring an extra step and level in the edge 93.

Thus with the system according to the present invention it is possible for the user to operate one of the switches 36 in order to space one of the lines of the master 27 over the gap 25. Thereafter he may operate one of the switches 95a–c in order to determine the width of the gap in the master. Such an arrangement makes it very easy to prepare form letters, mailings, time-sheets and the like. Copies are produced which are very neat and each carry only the desired information. More particularly in a useful arrangement an address sheet can constitute the master 27, a letterhead can constitute the mask part 23, and a form-letter the mask part 24 so that individualized letters can be prepared each of which bears the addressee's name, and each of which will appear to be an original prepared specifically for that addressee.

It will be understood that each of the elements described above, or two or more together, may also find a useful application in other types of constructions differing from the types described above.

While the invention has been illustrated and described as embodied in a copying apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art fairly constitute essential characteristics of the generic or specific aspects of this invention.

What is claimed as new and desired to be protected by Letters Patent is set forth in the appended claims.

1. A copying method comprising the steps of:
supporting an original face down on a transparent support;
interposing a mask having two parts forming a slot between said original and said support and exposing only a portion of said original through said slot to a scanner on the other side of said support;
repeatedly scanning said original through said support with said scanner and producing a succession of copies each carrying only that portion of the original exposed during the respective scan through said slot;
automatically relatively displacing said original and said mask after each scan to expose a different portion of said original to said scanner for the subsequent scanning, whereby each scan produces a copy carrying a replica of a different portion of said original; and
varying the width of said slot by relatively displacing said parts.

2. The copying method defined in claim 1 wherein said mask and said original are relatively displaced by displacing said mask while holding said original still.

3. The copying method defined in claim 1 wherein said mask and said original are relatively displaced by displacing said original while holding said mask still.

4. The copying method defined in claim 1 wherein said mask and said original are held by opposite edges during their relative displacement.

5. A copier comprising:
a transparent support adapted to receive an original face down;
copy means for scanning the original through said support and for producing a copy carrying that material on the original exposed through said support;
a mask adapted to underlie the original and including
a first mask part,
a first clamp holding said first mask part at said support,
a second mask part,
a second clamp holding said second mask part at said support spaced from said first part and defining therewith a slot alignable with different portions of the original, and
means for relatively displacing said first and second clamps to vary the width of said slot, whereby different portions of the original are exposed to said copy means through said slot depending on its position;
transport means for relatively displacing the original and said mask in a stepwise manner; and
control means connected between said copy means and said transport means for operating said transport means to relatively displace the original and said mask through one step after each scan of the original by said copy means.

6. The copier defined in claim 5
wherein said means for relatively displacing said first and second clamps includes a motor, means connecting said motor to said second clamp, sensor means for ascertaining the relative positions of said first and second clamps, and actuating means between said sensor means and said motor for operating the latter.

7. The copier defined in claim 6
wherein said sensor means includes a plurality of spaced-apart switches, said second clamp having a stepped edge engageable with said switches.

8. A copier comprising:
a transparent support adapted to receive an original face down;
copy means for scanning the original through said support and for producing a copy carrying that material on the original exposed through said support;
a mask adapted to underlie the original and forming a slot alignable with different portions of the original, whereby different portions of the original are exposed to said copy means through said slot depending on its position;
transport means for relatively displacing the original and said mask in a stepwise manner and including
a clamp holding the original,
drive means for displacing said clamp in steps along said mask, and
means for sensing the position of said clamp; and
control means connected between said copy means and said transport means for operating said drive means to relatively displace the original and said mask through one step after each scan of the original by said copy means.

9. The copier defined in claim 8
wherein said drive means includes a wheel connected to said clamp and having a plurality of angularly equispaced teeth, and means engageable with said teeth to rotate said wheel through an angular distance corresponding to the distance between adjacent teeth after each scan.

10. The copier defined in claim 8
wherein said means for sensing includes a stepped edge of said clamp and a plurality of switches engageable with said edge and operable by the steps thereon.

* * * * *